United States Patent
Berkemeier

(10) Patent No.: US 9,746,854 B2
(45) Date of Patent: Aug. 29, 2017

(54) SYSTEM AND METHOD FOR CONTROLLING A VEHICLE

(71) Applicant: Autonomous Solutions, Inc., Petersboro, UT (US)

(72) Inventor: Matthew D. Berkemeier, Beverly Hills, MI (US)

(73) Assignee: Autonomous Solutions, Inc., Petersboro, UT (US)

(*) Notice: Subject to any disclaimer, the term of this patent is extended or adjusted under 35 U.S.C. 154(b) by 10 days.

(21) Appl. No.: 15/138,065

(22) Filed: Apr. 25, 2016

(65) Prior Publication Data

US 2016/0313735 A1    Oct. 27, 2016

Related U.S. Application Data

(60) Provisional application No. 62/152,203, filed on Apr. 24, 2015.

(51) Int. Cl.
*G01C 22/00* (2006.01)
*G05D 1/02* (2006.01)
*A01B 69/04* (2006.01)

(52) U.S. Cl.
CPC ......... *G05D 1/0212* (2013.01); *A01B 69/008* (2013.01); *G05D 2201/0201* (2013.01)

(58) Field of Classification Search
CPC ......... G05D 1/0212; G05D 2201/0201; G05D 1/0272; G05D 1/0255; G05D 1/027; G05D 1/0278; G05D 1/0274; A01B 69/008
USPC ........................ 701/1, 25, 412, 418; 382/291
See application file for complete search history.

(56) References Cited

U.S. PATENT DOCUMENTS

| | | | | |
|---|---|---|---|---|
| 5,375,059 A * | 12/1994 | Kyrtsos | ............. | B60K 31/0008 342/357.24 |
| 5,648,901 A * | 7/1997 | Gudat | ................ | B60K 31/0008 701/23 |
| 6,671,600 B1 * | 12/2003 | Hintzy | ................. | G05D 1/0278 340/988 |

(Continued)

FOREIGN PATENT DOCUMENTS

WO    WO2004031691    4/2004

OTHER PUBLICATIONS

S. M. LaValle, *Planning Algorithms*. Cambridge University Press, 2006.

(Continued)

*Primary Examiner* — Shardul Patel
(74) *Attorney, Agent, or Firm* — Maywood IP Law; David Meibos

(57) ABSTRACT

Drivable path plan systems and methods for autonomous vehicles disclosed herein may receive original path plan data, including a first path element tangentially connected to a second path element at a transition connection point. A drivable path plan may be calculated for the autonomous vehicle between the first path element and the second path element using a clothoid spline. An initial connection point may be identified, as well as an initial heading and an initial curvature along the first path element, and a final connection point, a final heading, and a final curvature along the second path element. The clothoid spline may be inserted between the initial connection point along the first path element and the final connection point along the second path element.

20 Claims, 11 Drawing Sheets

(56) References Cited

U.S. PATENT DOCUMENTS

| | | | | |
|---|---|---|---|---|
| 7,089,162 | B2* | 8/2006 | Nagel | G01C 21/32 701/409 |
| 2005/0027415 | A1* | 2/2005 | Iwazaki | B62D 15/029 701/36 |
| 2006/0100780 | A1* | 5/2006 | Aleksic | G01C 21/32 701/409 |
| 2010/0204866 | A1* | 8/2010 | Moshchuk | B62D 15/0285 701/25 |
| 2012/0121206 | A1* | 5/2012 | Witmer | G01C 21/32 382/291 |
| 2012/0185113 | A1* | 7/2012 | Pampus | B60W 30/06 701/1 |
| 2015/0346728 | A1* | 12/2015 | Peake | G05D 1/0212 701/23 |

OTHER PUBLICATIONS

A. D. Luca, G. Oriolo, and C. Samson, "Feedback control of a nonholonomic car-like robot," in Robot Motion Planning and Control, ser. Lecture Notes in Control and Information Sciences, J.-P. Laumond, Ed. Berlin/Heidelberg: Springer, 1998, vol. 229, pp. 171-253.

T. Fraichard and A. Scheuer, "From Reeds and Shepp's to continuous-curvature paths," IEEE Transactions on Robotics and Automation, vol. 20, No. 6, Dec. 2004.

M. D. Berkemeier, "Optimal, stable switching between arcs during low-speed Ackerman path tracking," in Proceedings of the 2013 American Control Conference, 2013.

"Optimal, stable switching between arcs during low-speed Ackerman path tracking with rate-limited steering," in Proceedings of the 52nd IEEE Conference on Decision and Control, 2013.

R. M. Murray and S. S. Sastry, "Nonholonomic motion planning: Steering using sinusoids," IEEE Transactions on Automatic Control, vol. 38, No. 5, pp. 700-716, May 1993.

C. Samson, "Control of chained systems, application to path following, and time-varying point-stabilization of mobile robots," IEEE Transactions on Automatic Control, vol. 40, No. 1, pp. 64-77, Jan. 1995.

P. Hingwe and M. Tomizuka, "A variable look-ahead controller for lateral guidance of four wheeled vehicles," in Proceedings of the American Control Conference, 1998.

J. Guldner, H.-S. Tan, and S. Patwardhan, "Study of design directions for lateral vehicle control," in Proceedings of the 36th Conference on Decision & Control, 1997.

S. Patwardhan, H.-S. Tan, and J. Guldner, "A general framework for automatic steering control: system analysis," in Proceedings of the American Control Conference, 1997.

J. Wit, C. D. Crane III, and D. Armstrong, "Autonomous ground vehicle path tracking," Journal of Robotic Systems, vol. 21, No. 8, 2004.

T. Hellstrom and O. Ringdahl, "Follow the past: a path tracking algorithm for autonomous vehicles," International Journal of Vehicle Autonomous Systems, vol. 4, No. 2-4, 2006.

D. S. Meek and D. J. Walton, "Clothoid spline transition spirals," Mathematics of Computation, vol. 59, No. 199, pp. 117-133, Jul. 1992.

V. Kostov and E. Degtiariova-Kostova, "Suboptimal paths in the problem of a planar motion with bounded derivative of the curvature," INRIA, Tech. Rep. 2051, Jul. 1993.

"Some properties of clothoids," INRIA, Tech. Rep. 2752, Dec. 1995.

E. Degtiariova-Kostova and V. Kostov, "Irregularity of optimal trajectories in a control problem for a car-like robot," INRIA, Tech. Rep. 3411, Apr. 1998.

A. Kelly and B. Nagy, "Reactive nonholonomic trajectory generation via parametric optimal control," International Journal of Robotics research, vol. 22, No. 7-8, pp. 583-601, Jul.-Aug. 2003.

F.L. Lewis, D.L. Vrabie, and Y.-C. Ho, Applied Optimal Control. Taylor & Francis, 1975.

W.H. Press, S.A. Teukolsky, W.T. Vetterling, and B.P. Flannery, Numerical Recipes in C: the Art of Scientific Computing, $2^{nd}$ ed. Cambridge, 1992.

\* cited by examiner

SYSTEM AND METHOD FOR CONTROLLING A VEHICLE

CROSS-REFERENCE TO RELATED APPLICATIONS

The present application claims the benefit of U.S. Provisional Patent Application Ser. No. 62/152,203, entitled CLOTHOID SEGMENTS FOR SWITCHING BETWEEN ARCS, which was filed on Apr. 24, 2015 and is incorporated by reference herein as though set forth in its entirety.

TECHNICAL FIELD

The present disclosure relates to systems and methods for controlling autonomous vehicles. More specifically, the present disclosure relates to systems and methods that are configured to create and execute optimal drivable path plans for autonomous vehicles based on clothoid segments.

BACKGROUND

Vehicles, such as automobiles, off-road vehicles, agricultural tractors, or self-propelled agricultural implements, may be used in a variety of tasks (e.g., to transport people or goods from one location to another, to tow agricultural implements, to harvest, plow, cultivate, spray, etc.). Traditionally, vehicles are manually operated by an operator. That is, the steering and speed of a vehicle are controlled by an operator driving the vehicle. Unfortunately, the operator may not drive the vehicle along an efficient path from one location to another location as compared to autonomously controlled vehicles.

Accordingly, the number of applications for automated ground vehicles has been rapidly increasing. Examples include autonomous mining trucks, tractors, military target vehicles, and durability testing of passenger vehicles. It is convenient to construct desired paths out of tangentially connected circular arc and straight line segments, which have been shown to be optimal in terms of path length. Unfortunately, such paths cannot actually be driven if the steering angle is produced by a servo system, which introduces a finite steering rate causing lag, and most autonomous vehicles typically include rate-limited servo steering systems that have a maximum turning rate.

Previous applications in this area derived schemes for driving such paths under the assumption that transitions between segments were "unplanned." In these applications, the control system simply switches to a new path segment at some time ahead of actually reaching the transition point. This rudimentary process is one way of dealing with assumptions of linear lag and a nonlinear rate-limited actuator. However, these previous applications may experience path segment transitions as "disturbances" that the control system must continuously overcome, which may lead to control system degradation over time. Furthermore, previous applications may not achieve optimal transitions between path segments.

SUMMARY

The various systems and methods of the present disclosure have been developed in response to the present state of the art, and in particular, in response to the problems and needs in the art that have not yet been fully solved by currently available technology. The systems and methods of the present disclosure may provide optimal transitions between path segments that minimize off-path normal error and/or optimal transitions between path segments that minimize lateral acceleration and achieve smoother transitions between path segments, thus reducing wear and tear on autonomous vehicles and saving maintenance costs.

In some embodiments, a drivable path plan system for an autonomous vehicle may include an original path plan module that receives original path plan data including a first path element tangentially connected to a second path element at a transition connection point. The drivable path plan system may also include a drivable path plan module that calculates a drivable path plan for the autonomous vehicle between the first path element and the second path element using a clothoid spline. A connection point identification module may also be used to identify an initial connection point, an initial heading, and an initial curvature along the first path element, as well as a final connection point, a final heading, and a final curvature along the second path element. The clothoid spline may be inserted between the initial connection point along the first path element and the final connection point along the second path element.

In other embodiments, a method of calculating a drivable path plan for an autonomous vehicle may include receiving original path plan data that includes a first path element tangentially connected to a second path element at a transition connection point. The method may also include calculating a drivable path plan for the autonomous vehicle between the first path element and the second path element using a clothoid spline. The method may identify an initial connection point, an initial heading, and an initial curvature along the first path element, as well as a final connection point, a final heading, and a final curvature along the second path element. The method may also insert the calculated clothoid spline between the initial connection point along the first path element and the final connection point along the second path element.

In yet other embodiments, a computer program product for calculating a drivable path plan for an autonomous vehicle may include a nontransitory computer readable medium and computer program code, encoded on the nontransitory computer readable medium, configured to cause at least one processor to perform the steps of: receiving original path plan data including a first path element tangentially connected to a second path element at a transition connection point, and calculating a drivable path plan for the autonomous vehicle between the first path element and the second path element using a clothoid spline by identifying an initial connection point, an initial heading, and an initial curvature along the first path element, as well as a final connection point, a final heading, and a final curvature along the second path element. The calculated clothoid spline may be inserted between the initial connection point along the first path element and the final connection point along the second path element.

In alternative embodiments, rather than starting with arc and line segments and then inserting clothoid transitions (i.e., a two step process), the original path plan could be made directly with clothoid segments that connect together tangentially with matching curvatures resulting in a one step process.

These and other features and advantages of the present disclosure will become more fully apparent from the following description and appended claims, or may be learned by the practice of the disclosure as set forth hereinafter.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

Exemplary embodiments of the present disclosure will be best understood by reference to the drawings, wherein like parts are designated by like numerals throughout. It will be readily understood that the components of the present disclosure, as generally described and illustrated in the figures herein, could be arranged and designed in a wide variety of different configurations. Thus, the following more detailed description of the embodiments of the system and method, as represented in FIGS. 1 through 16, is not intended to limit the scope of the present disclosure, as claimed in this or any other application claiming priority to this application, but is merely representative of exemplary embodiments of the present disclosure.

Disclosed herein are methods for commanding an autonomous vehicle to more accurately follow paths which consist of arc and line segments. An adjustable parameter may be provided to control the tradeoff between accuracy and smoothness when making a transition between two arc segments or between an arc and line segment.

In one example of use, a pair of tangentially connected arc segments or a tangentially connected arc segment and line segment are provided as an original or desired path plan. Between these two segments, three clothoid segments are inserted. These clothoid segments connect tangentially to the original segments and to each other. In addition, curvatures match at each point where there is a connection. Finally, in addition to connection, tangency, and curvature constraints being satisfied, the clothoids may be chosen to minimize the maximum excursion from the original path (e.g., the off-path normal error), defined by of the pair of tangentially connected arc segments or the tangentially connected arc segment and line segment. The new path plan with the clothoid transitions can be driven by a vehicle with rate-limited steering, whereas the original desired path plan cannot be driven by a vehicle with rate-limited steering because the steering wheel angle cannot be instantaneously changed when transitions occur. This places a burden on the path tracking algorithm, which must do the best possible job of handling abrupt changes in path curvature. The new path plan is a drivable path plan that may be as close as possible to the original path plan. In this manner, the off-path normal error may be minimized with respect to the original path, which consists of simple arcs and/or line segments.

Figure 1:
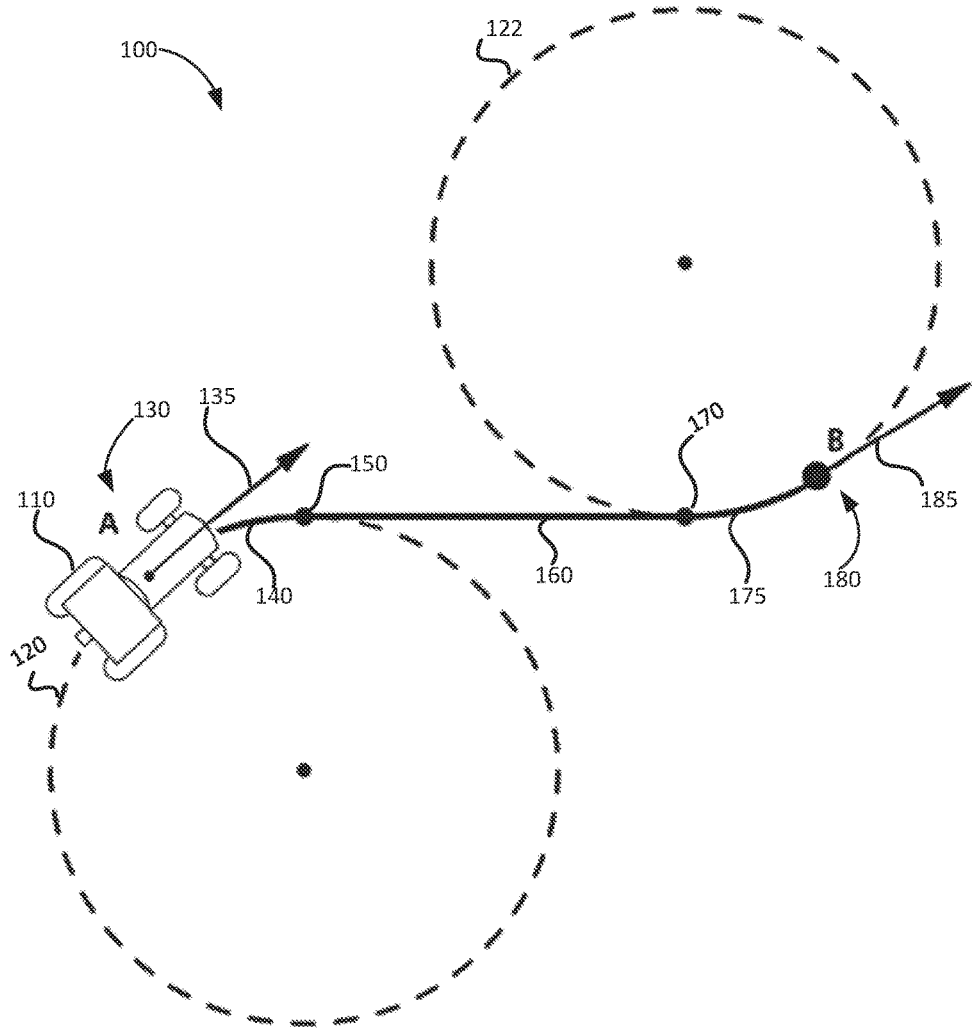
FIG. 1 illustrates a graphical top view of an autonomous vehicle executing a "right turn-straight line-left turn" Dubins path.
Figure 2:
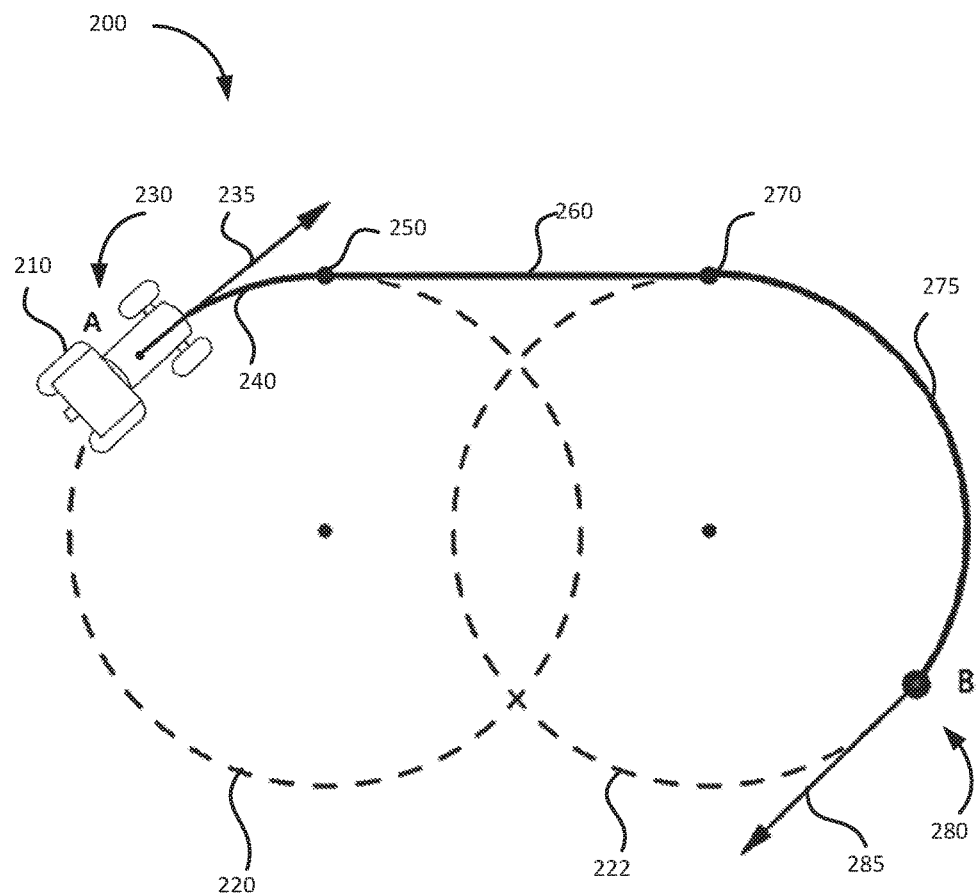
FIG. 2 illustrates a graphical top view of an autonomous vehicle executing a "right turn-straight line-right turn" Dubins path.
Figure 3:
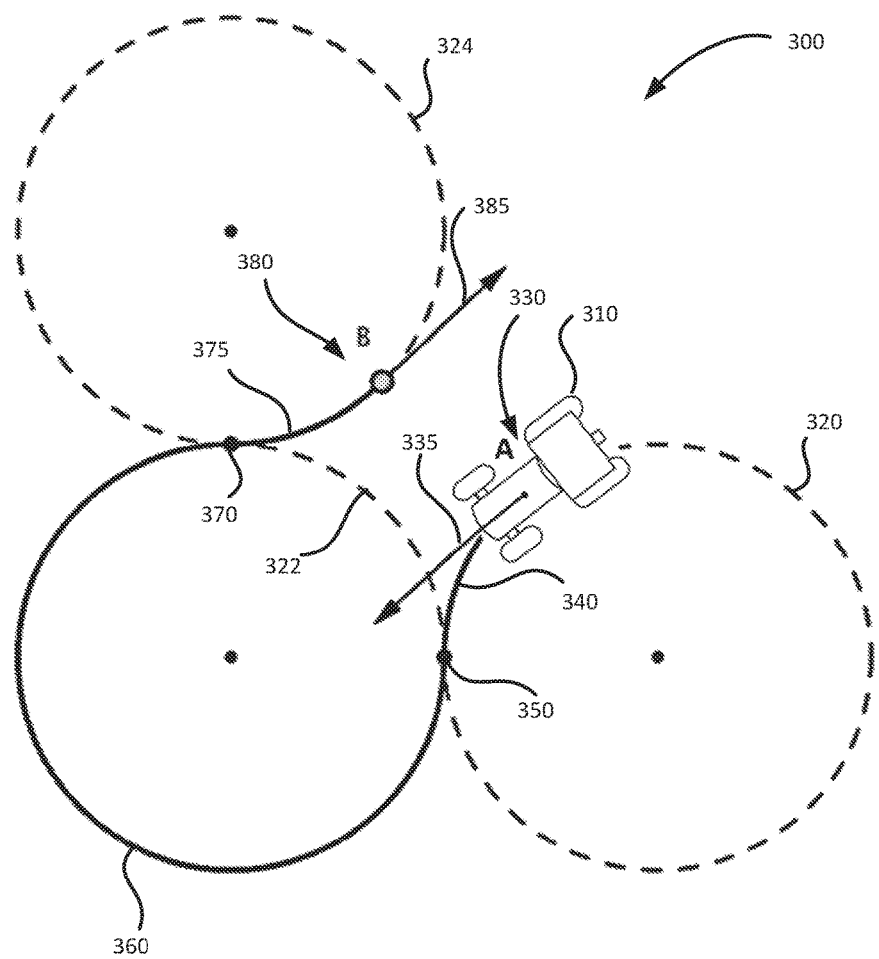
FIG. 3 illustrates a graphical top view of an autonomous vehicle executing a "left turn-straight line-left turn" Dubins path.

FIGS. 1-3 illustrate various graphical top views of an autonomous vehicle 110, 210, 310 executing different path plans made of simple circular arcs and straight lines, known as Dubins paths. In particular, FIG. 1 shows the autonomous vehicle 110 executing a "right turn-straight line-left turn" Dubins path; FIG. 2 shows the autonomous vehicle 210 executing a "right turn-straight line-right turn" Dubins path; and FIG. 3 shows the autonomous vehicle 310 executing a "left turn-straight line-left turn" Dubins path.

In geometry, a Dubins path typically refers to the shortest curve that connects two points in the two-dimensional Euclidean plane (e.g., the "x-y" plane) with a constraint on the curvature of the path and prescribed initial and terminal tangents to the path. A Dubins path typically consists of maximum curvature arcs and/or straight line segments to achieve the shortest feasible path between two destinations for an autonomous vehicle. The optimal path type can be described as a vehicle making a combination of 'right turns (R)', 'left turns (L)' or driving 'straight (S).' Thus, an optimal Dubins path will always be at least one of the following six types: RSR, RSL, LSR, LSL, RLR, and LRL. In this manner, given an initial position, an initial heading, a final position, and a final heading, an optimal path may be created to form a shortest path length between these two point using simple arcs and straight lines.

FIG. 1 illustrates an autonomous vehicle 110 executing an RSL Dubins path 100, corresponding to a first arc 140 (right turn) that lies on a first circle 120, followed by a straight line segment 160, followed by a second arc 175 (left turn) that lies on a second circle 122. The autonomous vehicle 110 may start at an initial point "A" 130 along the first arc 140 with an initial heading 135. At a first transition connection point 150, the autonomous vehicle 110 may transition to the straight line segment 160. At a second transition connection point 170, the autonomous vehicle 110 may transition to the second arc 175 and follow this arc until it reaches its final destination at a final point "B" 180 along the second arc 175 where it will have a final heading 185.

FIG. 2 illustrates an autonomous vehicle 210 executing an RSR Dubins path 200, corresponding to a first arc 240 (right turn) that lies on a first circle 220, followed by a straight line segment 260, followed by a second arc 275 (right turn) that lies on a second circle 222. The autonomous vehicle 210 may start at an initial point "A" 230 along the first arc 240 with an initial heading 235. At a first transition connection point 250, the autonomous vehicle 210 may transition to the straight line segment 260. At a second transition connection point 270, the autonomous vehicle 210 may transition to the second arc 275 and follow this arc until it reaches its final destination at a final point "B" 280 along the second arc 275 where it will have a final heading 285.

FIG. 3 illustrates an autonomous vehicle 310 executing an LRL Dubins path 300, corresponding to a first arc 340 (left turn) that lies on a first circle 320, followed by a second arc 360 (right turn) that lies on a second circle 322, followed by a third arc 375 (left turn) that lies on a third circle 324. The autonomous vehicle 310 may start at an initial point "A" 330 along the first arc 340 with an initial heading 335. At a first transition connection point 350, the autonomous vehicle 310 may transition to the second arc 360 and follow this arc until it reaches the second transition connection point 370. The autonomous vehicle 310 may then transition to the third arc 375 and follow this arc until it reaches its final destination at a final point "B" 380 along the third arc 375 where it will have a final heading 385.

Figure 4:
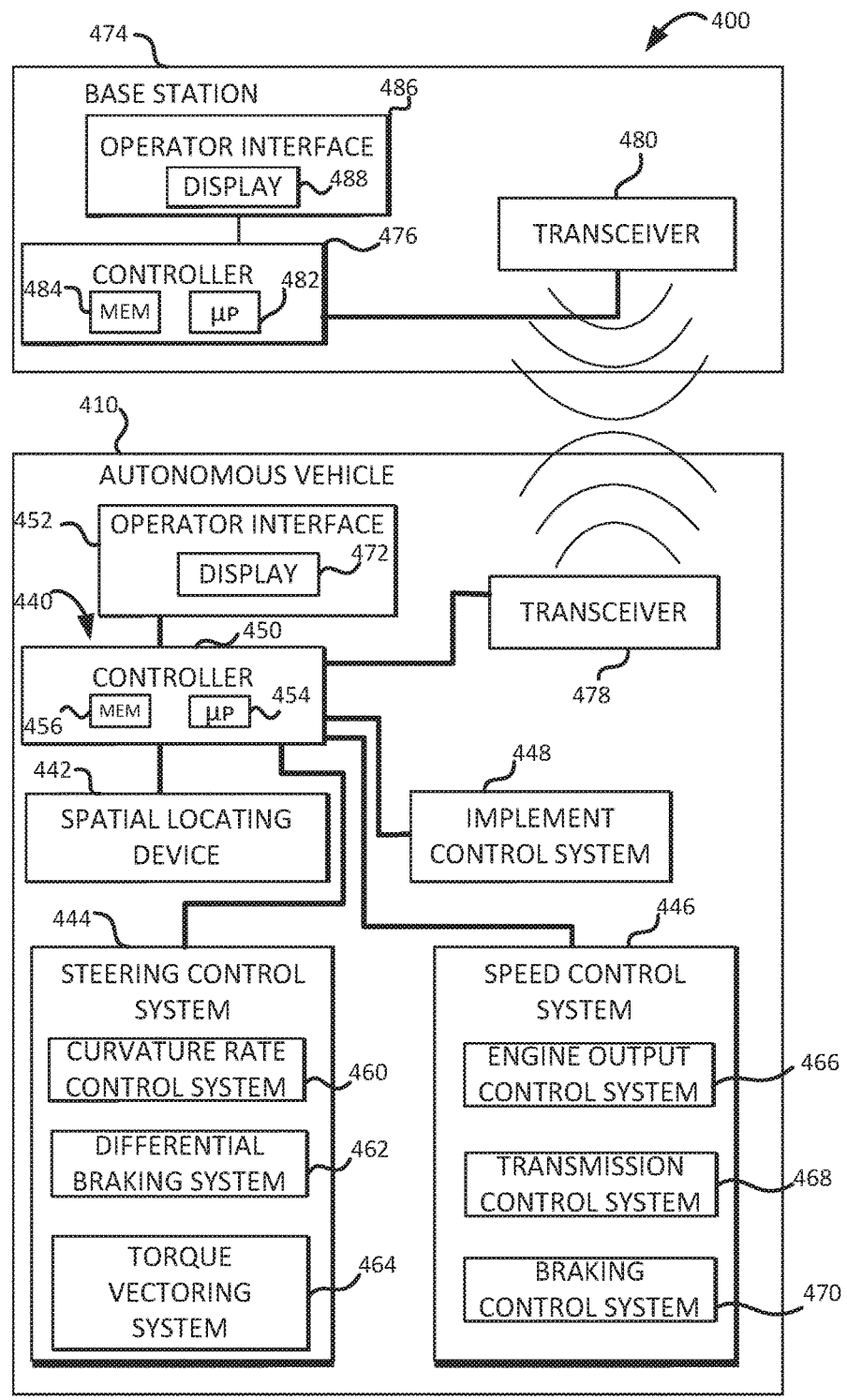
FIG. 4 illustrates a block diagram of an example autonomous vehicle communication and control system of the present disclosure.

FIG. 4 is a schematic diagram of an example communication and control system 400 that may be utilized in conjunction with the systems and methods of the present disclosure, in at least some embodiments. The communication and control system 400 may include a vehicle control system 440 which may be mounted on the autonomous vehicle 410. The autonomous vehicle 410 may also include a spatial locating device 442, which may be mounted to the autonomous vehicle 410 and configured to determine a position of the autonomous vehicle 410 as well as a heading and a speed of the autonomous vehicle 410. The spatial locating device 442 may include any suitable system configured to determine the position and/or other important characteristics of the autonomous vehicle 410, such as a global positioning system (GPS), a global navigation satellite system (GNSS), or the like. In certain embodiments, the spatial locating device 442 may be configured to determine the position and/or other characteristics of the autonomous vehicle 410 relative to a fixed point within a field (e.g., via a fixed radio transceiver). Accordingly, the spatial locating device 442 may be configured to determine the position of the autonomous vehicle 410 relative to a fixed global coordinate system using GPS, GNSS, a fixed local coordinate system, or any combination thereof.

The autonomous vehicle 410 may include a steering control system 444 configured to control a direction of movement of the autonomous vehicle 410, and a speed control system 446 configured to control a speed of the autonomous vehicle 410. In some embodiments, the autonomous vehicle 410 may include an implement control system 448 configured to control operation of an implement towed by the autonomous vehicle 410 or integrated within the autonomous vehicle 410. The control system 440 may further include a controller 450 communicatively coupled to the spatial locating device 442, the steering control system 444, the speed control system 446, and the implement control system 448.

The controller 450 may be configured to receive signals relative to many parameters of interest including, but not limited to: vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The controller 450 may be an electronic controller with electrical circuitry configured to process data from the spatial locating device 442, among other components of the autonomous vehicle 410. The controller 450 may include a processor, such as the illustrated microprocessor 454, and a memory device 456. The controller 450 may also include one or more storage devices and/or other suitable components (not shown). The processor 454 may be used to execute software, such as software for calculating drivable path plans. Moreover, the processor 454 may include multiple microprocessors, one or more "general-purpose" microprocessors, one or more special-purpose microprocessors, and/or one or more application specific integrated circuits (ASICS), or any combination thereof. For example, the processor 454 may include one or more reduced instruction set (RISC) processors.

The memory device 456 may include a volatile memory, such as random access memory (RAM), and/or a nonvolatile memory, such as ROM. The memory device 456 may store a variety of information and may be used for various purposes. For example, the memory device 456 may store processor-executable instructions (e.g., firmware or software) for the processor 454 to execute, such as instructions for calculating drivable path plans, and/or controlling the autonomous vehicle 410. The memory device 456 may include flash memory, one or more hard drives, or any other suitable optical, magnetic, or solid-state storage medium, or a combination thereof. The memory device 456 may store data such as field maps, maps of desired paths, vehicle characteristics, software or firmware instructions, and/or any other suitable data.

The steering control system 444 may include a curvature rate control system 460, a differential braking system 462, and a torque vectoring system 464 that may be used to steer the autonomous vehicle 410. In at least one embodiment, the curvature rate control system 460 may control a direction of an autonomous vehicle 410 by actuating a servo controlled steering system associated with the autonomous vehicle 410 with a curvature rate signal, such as an Ackerman style autonomous vehicle 410. In other embodiments, the curvature rate control system 460 may automatically rotate one or more wheels or tracks of the autonomous vehicle 410 via hydraulic actuators to steer the autonomous vehicle 410. By way of example, the curvature rate control system 460 may rotate front wheels/tracks, rear wheels/tracks, and/or intermediate wheels/tracks of the autonomous vehicle 410, either individually or in groups. The differential braking system 462 may independently vary the braking force on each lateral side of the autonomous vehicle 410 to direct the autonomous vehicle 410. Similarly, the torque vectoring system 464 may differentially apply torque from the engine to the wheels and/or tracks on each lateral side of the autonomous vehicle 410. While the illustrated steering control system 444 includes the curvature rate control system 460, the differential braking system 462, and the torque vectoring system 464, it should be appreciated that alternative embodiments may include one or more of these systems, in any suitable combination. Further embodiments may include a steering control system 444 having other and/or additional systems to facilitate turning the autonomous vehicle 410 such as an articulated steering system, a differential drive system, and the like.

In the illustrated embodiment, the speed control system 446 may include an engine output control system 466, a transmission control system 468, and a braking control system 470. The engine output control system 466 may be configured to vary the output of the engine to control the speed of the autonomous vehicle 410. For example, the engine output control system 466 may vary a throttle setting of the engine, a fuel/air mixture of the engine, a timing of the engine, and/or other suitable engine parameters to control engine output. In addition, the transmission control system 468 may adjust gear selection within a transmission to control the speed of the autonomous vehicle 410. Furthermore, the braking control system 470 may adjust braking force to control the speed of the autonomous vehicle 410. While the illustrated speed control system 446 includes the engine output control system 466, the transmission control system 468, and the braking control system 470, it should be appreciated that alternative embodiments may include one or more of these systems, in any suitable combination. Further embodiments may include a speed control system 446 having other and/or additional systems to facilitate adjusting the speed of the autonomous vehicle 410.

For embodiments that may include an implement, the implement control system 448 may be configured to control various parameters of the implement towed by and/or integrated within the autonomous vehicle 410. For example, in certain embodiments, the implement control system 448 may be configured to instruct an implement controller via a communication link, such as a CAN bus or ISOBUS, to adjust a penetration depth of at least one ground engaging tool of an agricultural implement, which may reduce the draft load on the autonomous vehicle 410. Furthermore, the implement control system 448 may instruct the implement controller to transition the agricultural implement between a working position and a transport position, to adjust a flow rate of product from the agricultural implement, to adjust a position of a header of the agricultural implement (e.g., a harvester, etc.), among other operations.

The operator interface 452 may be communicatively coupled to the controller 450 and configured to present data from the autonomous vehicle 410 via a display 472. Display data may include: data associated with operation of the autonomous vehicle 410, data associated with operation of an implement, a position of the autonomous vehicle 410, a speed of the autonomous vehicle 410, a desired path, a drivable path plan, a target position, a current position, etc. The operator interface 452 may be configured to enable an operator to control certain functions of the autonomous vehicle 410 such as starting and stopping the autonomous vehicle 410, inputting a desired path, etc. In some embodiments, the operator interface 452 may enable the operator to input parameters that cause the controller 450 to adjust the drivable path plan. For example, the operator may provide an input requesting that the desired path be acquired as quickly as possible, that an off-path normal error be minimized, that a speed of the autonomous vehicle 410 remain within certain limits, that a lateral acceleration experienced by the autonomous vehicle 410 remain within certain limits, etc. In addition, the operator interface 452 may be configured to alert an operator if the desired path cannot be achieved (e.g., via the display 472, or via an audio system (not shown), etc., for example).

In certain embodiments, the control system 440 may include a base station 474 having a base station controller 476 located remotely from the autonomous vehicle 410. For example, in certain embodiments, control functions of the control system 440 may be distributed between the controller 450 of the autonomous vehicle control system 440 and the base station controller 476. In certain embodiments, the base station controller 476 may perform a substantial portion of the control functions of the control system 440. For example, in certain embodiments, a first transceiver 478 positioned on the autonomous vehicle 410 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 480 at the base station 474. In these embodiments, the base station controller 476 may calculate drivable path plans and/or output control signals to control the curvature rate control system 444, the speed control system 446, and/or the implement control system 448 to direct the autonomous vehicle 410 toward the desired path, for example. The base station controller 476 may include a processor 482 and memory device 484 having similar features and/or capabilities as the processor 454 and the memory device 456 discussed previously. Likewise, the base station 474 may include an operator interface 486 having a display 488, which may have similar features and/or capabilities as the operator interface 452 and the display 472 discussed previously.

Before further discussing the details of the present disclosure, we will first consider the theoretical background behind clothoid segments and their application within the context of optimal control theory.

We may begin with the nonlinear dynamical system:

$$\dot{x}=f(x,u),$$

with the performance index:

$$J(t_0)=\int_{t_0}^{T}L(x,u)dt,$$

and the final-state constraint:

$$\psi(x(T))=0.$$

We then form the Hamiltonian:

$$H(x,u)=L(x,u)+\lambda^T f(x,u),$$

which gives us the state equations:

$$\dot{x} = \frac{\partial H}{\partial \lambda} = f, t \geq t_0,$$

as well as the co-state equations:

$$-\dot{\lambda} = \frac{\partial H}{\partial x} = \frac{\partial f^T}{\partial x}\lambda + \frac{\partial L}{\partial x}, t \leq T.$$

We then need to ensure that H is minimized with respect to u:

$$H(x^*,u^*,\lambda^*) \leq H(x^*,u,\lambda^*), \text{ all admissible } u,$$

where * denotes optimal quantities. Finally, the following boundary conditions must be satisfied:

$$x(t_0) \text{ given, } H(T)=0.$$

From a clothoid (or a Cornu Spiral, or a Euler Spiral) a planar parametric curve may be given by:

$$\begin{bmatrix} x(\tau) \\ y(\tau) \end{bmatrix} = \pi B \begin{bmatrix} C(\tau) \\ S(\tau) \end{bmatrix},$$

where:

$$C(\tau) = \int_0^\tau \cos\frac{\pi}{2}u^2 du,$$

$$S(\tau) = \int_0^\tau \cos\frac{\pi}{2}u^2 du,$$

and B is the magnitude of the clothoid. The magnitude of the clothoid spline B may correspond to a speed and a constant maximum curvature rate of a given autonomous vehicle. Thus, given a vehicle with curvature rate c and speed $\upsilon$, then:

$$B = \sqrt{\frac{\upsilon}{c\pi}}.$$

The tangent to a clothoid has the angle:

$$\frac{\pi\tau^2}{2},$$

while the curvature is:

$$\frac{\tau}{B}.$$

Figure 5:
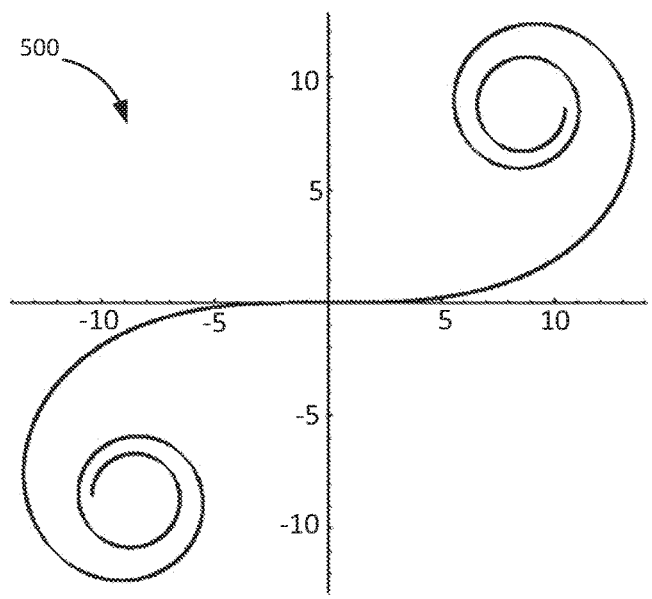
FIG. 5 is a graphical illustration of a clothoid function.

FIG. 5 is an example graphical illustration of a clothoid function having a magnitude of B=5.5.

For the vehicle model, we can use the simple kinematic bicycle model:

$$\dot{x} = \upsilon\cos\theta,$$

$$\dot{y} = \upsilon\sin\theta,$$

$$\dot{\theta} = \frac{\upsilon}{L}\tan\phi = \upsilon\kappa, \text{ and}$$

$$\dot{\kappa} = u,$$

where (x,y) is the location of the midpoint of the rear axle, θ is the heading of the vehicle, $\upsilon$ is the speed of the rear axle, L is the wheelbase, and φ is the angle of the steered front wheels (not to be confused with the φ used later for slalom paths, which is different). This is known as the "bicycle" model since the necessary differences in front wheel steering angles are ignored. Since the turning radius of the vehicle is:

$$\frac{L}{\tan\theta},$$

the last equation is often written in the alternate form, where the curvature, κ, is the reciprocal of the path radius. We will use φ exclusively as a parameter for slalom trajectories in the remainder of the present disclosure and will not refer to the angle of the steered wheels. Similarly, L will have a different meaning in the remainder of the present disclosure, and will not subsequently be used to refer to the wheelbase. u is the curvature rate, and due to the use of a steering actuator, it is constrained to satisfy:

$$u \in [-c,c]$$

for some rate limit c>0.

Since our vehicle model travels on circular arcs, it is convenient to use polar coordinates:

$$\rho = \sin\alpha$$

$$\rho = \cos\alpha$$

Figure 6:
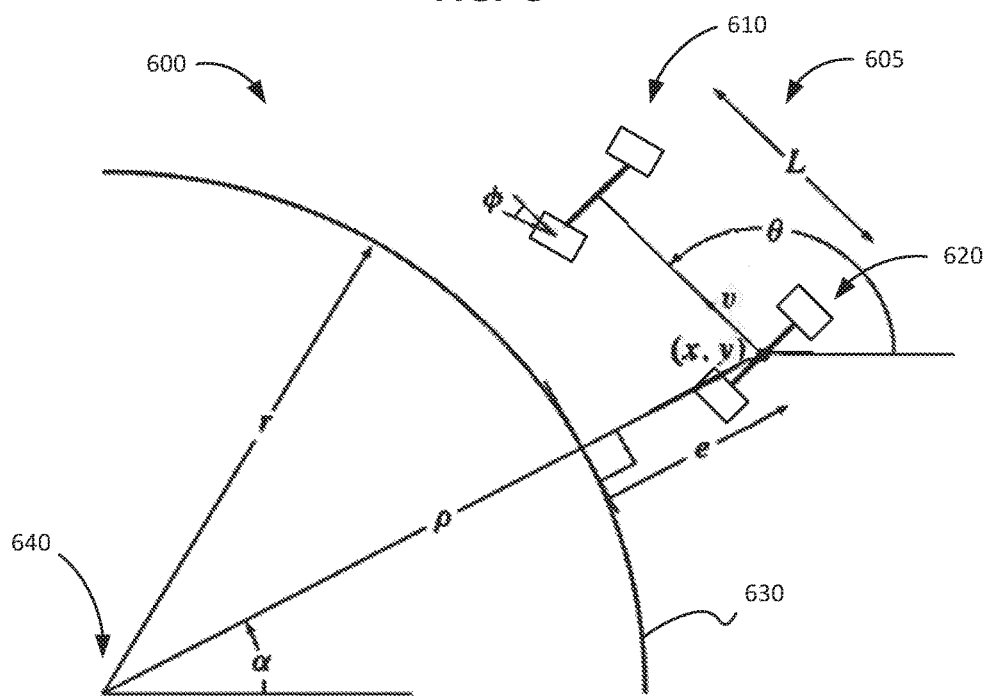
FIG. 6 is an illustration of a reference frame with notations that define normal error path tracking for an Ackerman style vehicle.

(See FIG. 6). FIG. 6 illustrates a reference frame 600 with notations that generally define normal error path tracking for an Ackerman style vehicle 605 having a rear axle 620 and a front axle 610 as the Ackerman style vehicle 605 tracks off-path with respect to a desired circular arc path 630 with a center 640.

In addition to the equations above, we may also use:

$$\beta = \theta - \alpha,$$

to simplify these equations, resulting in:

$$\dot{\rho} = \upsilon\cos\beta,$$

$$\dot{\beta} = \upsilon\left(\kappa - \frac{\sin\beta}{\rho}\right),$$

$$\dot{\alpha} = \upsilon\frac{\sin\beta}{\rho}, \text{ and}$$

$$\dot{\kappa} = u.$$

A nice feature of this new set of coordinates is that since the control κ is generally only a function of ρ and β, the first two equations are independent of α and form a reduced system which can be analyzed more easily. For the tracking of circles, β gives the angle between the vehicle and the path, including an offset. So, for example, β=π/2 means the vehicle is parallel to the circular path and is pointed in the counter-clockwise direction. Similarly, β=-π/2 means the vehicle is parallel to the path and is pointed in the clockwise direction.

Figure 7:
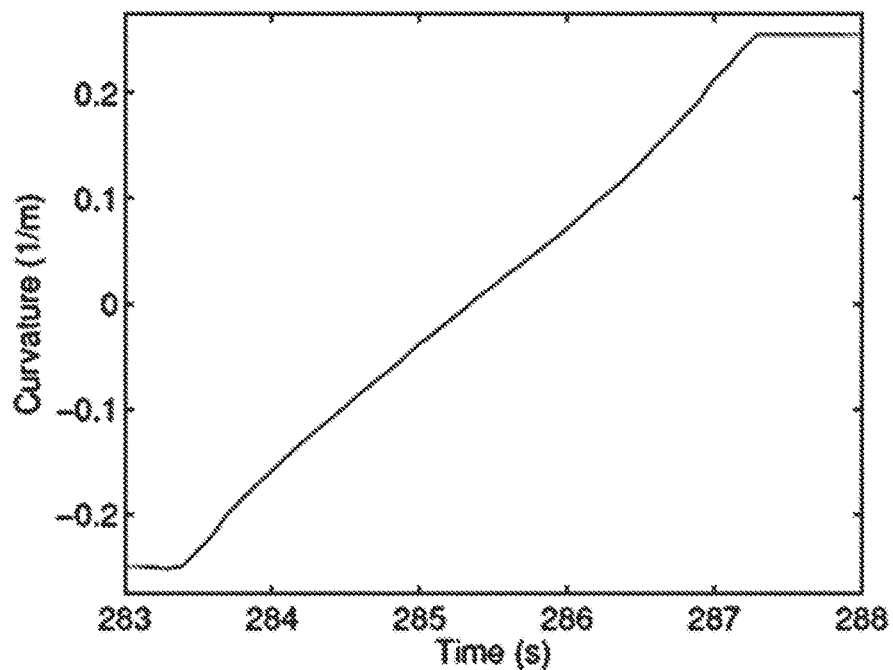
FIG. 7 is a graphical illustration of a rate-limited steering step response for a vehicle.
Figure 8:
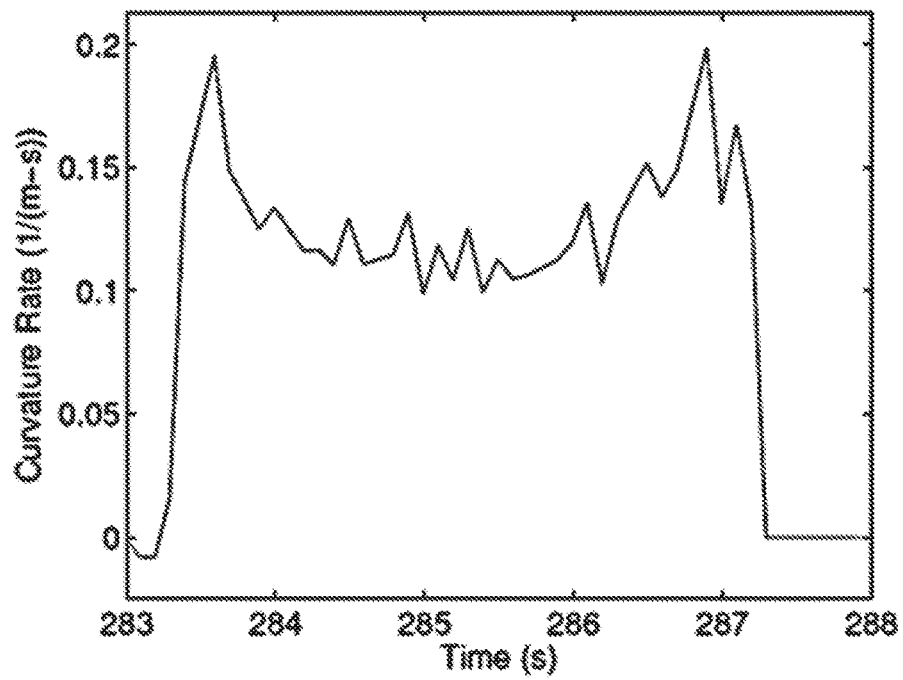
FIG. 8 is a graphical illustration of the derivative of the rate-limited steering step response of FIG. 7.

FIG. 7 is a graphical illustration of a rate-limited steering step response for an example Ackerman style vehicle (not shown). As can be seen, the steering rate limit for the example Ackerman style vehicle may not have a perfectly uniform slope, or rate of curvature, as the step response moves between −100% to 100% steering change. This nonlinearity may become more evident when viewing a derivative of the steering step response, as can be seen in FIG. 8, which shows the change in slope resulting in a somewhat "bowl shape" toward the extreme curvature edges. This may be due to nonlinearity in the steering linkage of the vehicle that may produce more curvature change at the extreme curvature ranges. However, the slope, or rate of curvature, may be sufficiently constant close to the center of the steering angle travel, such that it may be approximated as having a relatively constant value.

In order to minimize a measure of the off-path error, we may use:

$$L = \int_0^T (\rho(t)-r)^{2n} dt$$

where n is a positive integer. The larger the value, the closer we come to using the infinity norm, which is the metric of interest. We may form the Hamiltonian:

$$H = (\rho - r)^{2n} + \lambda_1 v \cos\beta + \lambda_2 v\left(\kappa - \frac{\sin\beta}{\rho}\right) + \lambda_3 u.$$

To minimize the Hamiltonian with respect to u, we choose:

$$u = -c \, sgn(\lambda_3),$$

and from the Hamiltonian we may form the following three co-state equations:

$$\dot\lambda_1 = -\left(\lambda_2 v \frac{\sin\beta}{\rho^2} + 2n(\rho - r)^{2n-1}\right),$$

$$\dot\lambda_2 = \lambda_1 v \sin\beta + \lambda_2 v \frac{\cos\beta}{\rho}, \text{ and}$$

$$\dot\lambda_3 = -\lambda_2 v.$$

Figure 9:
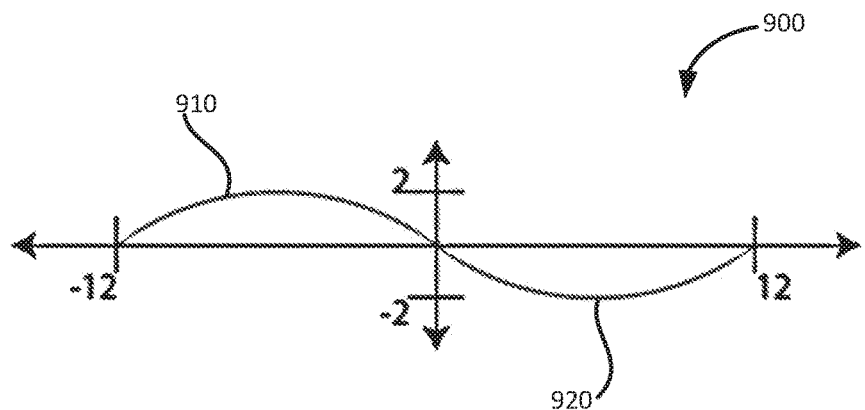
FIG. 9 is an illustration of a slalom path with two tangentially connected circular arcs, that may be executed by a vehicle as a right turn-left turn Dubins style path plan.

We now consider the problem of transitioning from an arc of one radius to another arc of the same radius, but oriented in the opposite direction, with the arcs tangent at the transition connection point where they connect to each other. This arrangement is depicted in FIG. 9 where the center of the first arc is located at (x,y)=(−6, −8) m, and the center of the second arc is at (x,y)=(6, 8) m. Each arc has a radius of 10 m and the arcs are tangent at the origin, but the curvature changes discontinuously from:

0.1 m$^{-1}$ to 0.1 m$^{-1}$.

In a first method, consider the problem of finding the optimal transition from the clockwise arc to the counter-clockwise arc in FIG. 9. FIG. 9 is an illustration of a slalom path with two tangentially connected circular arcs that may be executed by a vehicle as a right turn-left turn Dubins style path plan. Here we may take advantage of the symmetry of the problem and start at the origin by arguing that, due to symmetry, the solution must pass through the origin. If this were not the case, then the error on one side of the y-axis would be greater than the error on the other side, and we would not achieve a minimum of the error. The initial conditions at the origin are given by:

$$\rho(0)=r, \kappa(0)=0.$$

These initial conditions state that the vehicle is on the path, and the curvature the vehicle follows passes through zero at the origin. Note that β(0) is unconstrained, i.e., we may not know what the heading of the vehicle with respect to the path will be. β(0) will be one of the parameters we vary as we search for a solution. We may also chose n=4.

The final time T is unknown. At this final time we have:

$$\rho(T) = r, \beta(T) = \frac{\pi}{2}, \kappa(T) = \frac{1}{r}.$$

There is no constraint on the initial heading error β(0) or on the value of the final time T. We do need to satisfy the final condition H(T)=0 as well. Thus, a search needs to be performed where we vary the five parameters β(0), $\lambda_1$(0), $\lambda_2$(0), $\lambda_3$(0), and T to attempt to satisfy the four constraints:

$$\rho(T) = r, \beta(T) = \frac{\pi}{2}, \kappa(T) = \frac{1}{r}, H(T) = 0,$$

Figure 10:
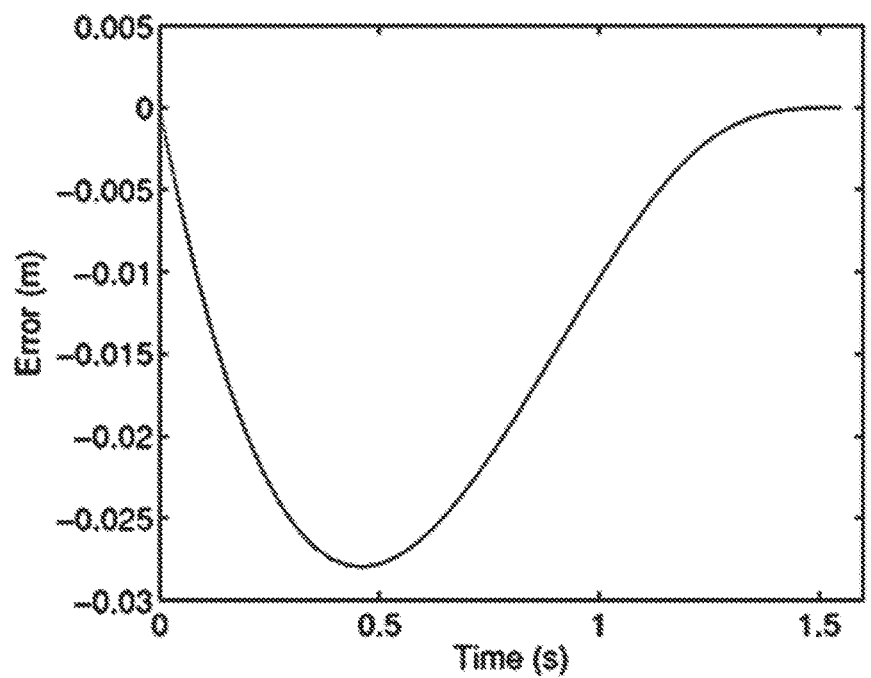
FIG. 10 is a graphical illustration of the off-path error for an optimal transition from the midpoint between the two arcs in FIG. 9 to a final position along the second arc.
Figure 11:
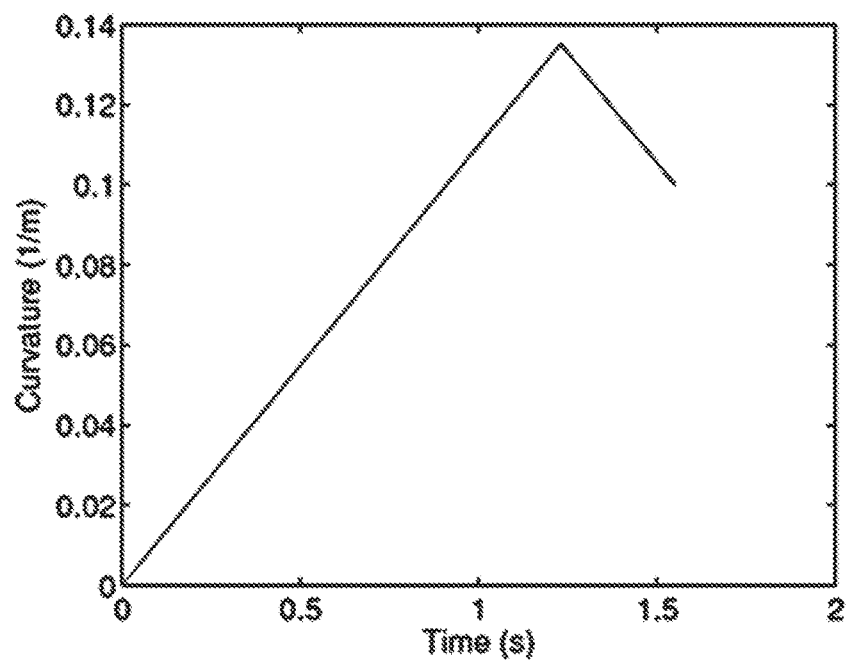
FIG. 11 is a graphical illustration of the curvature for the optimal transition from the midpoint between the two arcs in FIG. 9 to the final position along the second arc.

This may be done by performing a very coarse exhaustive search first in an attempt to find rough parameter values that come close to satisfying the constraints. Once some candidate parameters are found, a Newton-Raphson search may then be performed to find exact values. The solution found in this example is:

β(0)=1.639rad,$\lambda_1$(0)=0.230,$\lambda_2$(0)=−0.658,$\lambda_3$(0)=−0.096, and T=1.55 s FIGS. 10 and 11 illustrate the solution graphically, with FIG. 10 showing the off-path error for an optimal transition from the midpoint between the two arcs in FIG. 9 to a final position along the second arc and FIG. 11 showing the curvature for the optimal transition from the midpoint between the two arcs in FIG. 9 to the final position along the second arc. The maximum error shown if FIG. 10 is about 0.028 m and the switch from a positive curvature rate to a negative curvature rate takes place at about 1.23 seconds, as can be seen in FIG. 11.

A second method may be to start on the first arc and end at the origin. The initial conditions in this case would be:

$$\rho(0) = r, \beta(0) = -\frac{\pi}{2}, \kappa(0) = -\frac{1}{r}..$$

The final conditions are:

$$\rho(T)=r, H(T)=0, \kappa(T)=0.$$

In this case, β(T) is unconstrained as we may not know what the heading will be when the vehicle drives through the origin. We may chose n=4.

Figure 12:
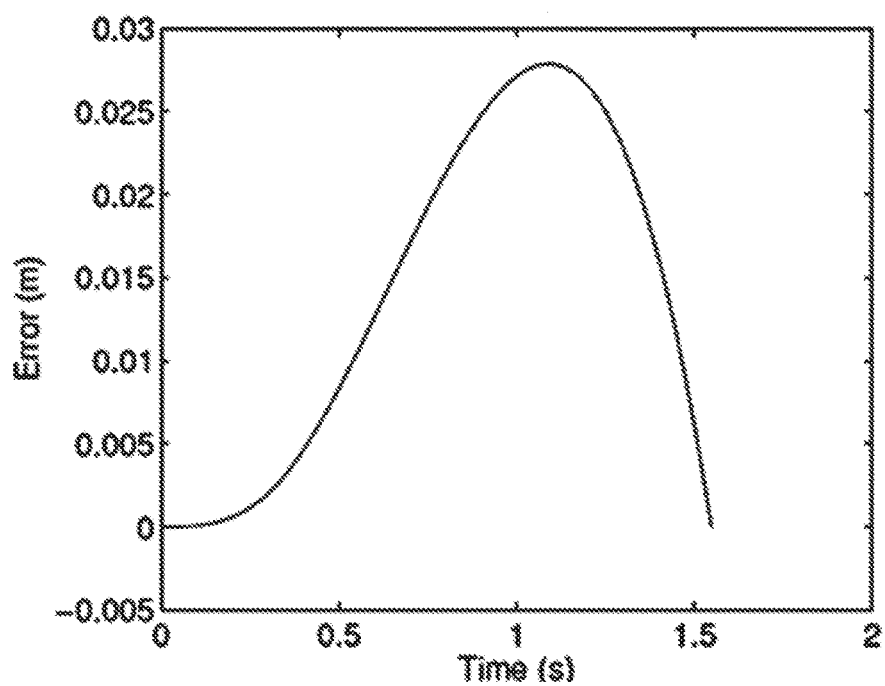
FIG. 12 is a graphical illustration of the off-path error for an optimal transition from the midpoint between the two arcs in FIG. 9 to an initial position along the first arc.
Figure 13:
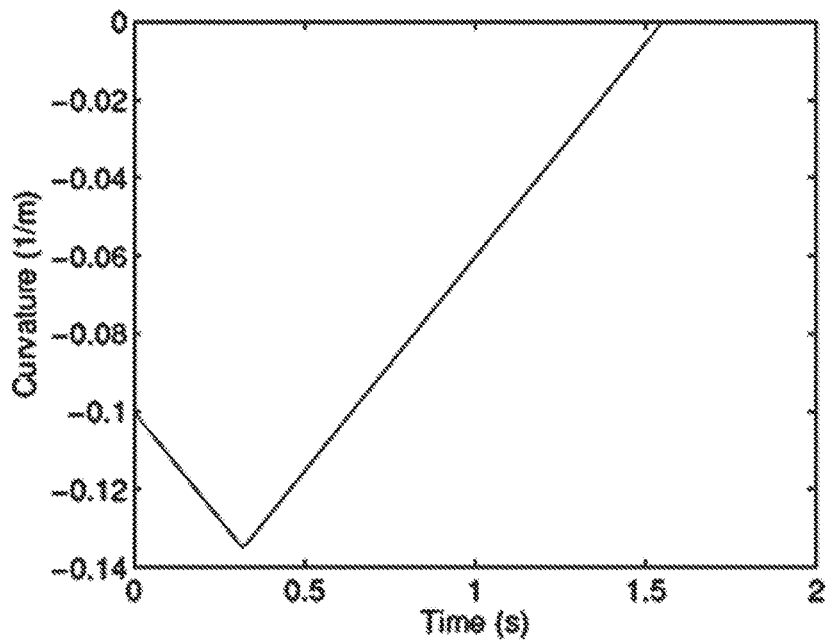
FIG. 13 is a graphical illustration of the curvature for the optimal transition from the midpoint between the two arcs in FIG. 9 to the initial position along the first arc.

The solution found in this example is:

$\lambda_1$(0)=5.4×10$^{-6}$,$\lambda_2$(0)=1.7×10$^{-5}$,$\lambda_3$(0)=9.9×10$^{-6}$, and T=1.55 s FIGS. 12 and 13 illustrate the solution graphically, with FIG. 12 showing the off-path error for an optimal transition from the midpoint between the two arcs in FIG. 9 to an initial position along the first arc, and FIG. 13 showing the curvature for the optimal transition from the midpoint between the two arcs in FIG. 9 to the initial position along the first arc. The maximum error shown if FIG. 12 is about 0.028 m and the switch from a negative curvature rate to a positive curvature rate takes place at about 0.32 seconds, as can be seen in FIG. 13.

A third method of solving this problem is fundamentally different than the prior two methods. Rather than using optimal control theory, an approach based on parametric curves, nonlinear equation solving, and minimization may be used in this method. Given that an optimal transition involves changing the curvature at a constant maximum rate, the segments are clothoids with a magnitude given by the vehicle speed and maximum curvature rate. A clothoid can be rotated and translated. This involves three parameters. Further, the starting and ending parameter can be chosen, and this adds an additional two parameters. Thus, a clothoid segment is associated with five parameters.

Constraining a position gives two parameters, and constraining the tangent direction and the curvature give two more constraint parameters. Thus, each time a clothoid segment is added, an additional five parameters of freedom are added but four constraint equations are also added. If there is a single clothoid inserted between two arcs, then there are eight equations but only seven unknowns. For two clothoids there will be twelve equations and twelve unknowns, and a solution is possible. However, the optimal control approach tells us that there should be three clothoid segments inserted between two arcs. This leads to sixteen co equations and seventeen unknowns. The extra degree of freedom can be adjusted to optimize the solution.

Let the starting angle on the first arc be $\alpha_1$ and let the ending angle on the second arc be $\alpha_2$. For clothoid i let the rotation be $\psi_i$, the translation be $(x_i, y_i)$ and the starting and ending parameters be $t_i$, and $u_i$, respectively. Thus, the seventeen unknowns are:

$\alpha_1, \alpha_2,$
$\psi_1, x_1, y_1, t_1, u_1,$
$\psi_2, x_2, y_2, t_2, u_2,$
$\psi_3, x_3, y_3, t_3, u_3.$ The first two equations constrain the first arc and clothoid segments to meet at the same point:

$$\begin{bmatrix} r_1 \cos\alpha_1 + x_{01} \\ r_1 \sin\alpha_1 + y_{01} \end{bmatrix} = \pi\beta \begin{bmatrix} \cos\psi_1 & -\sin\psi_1 \\ \sin\psi_1 & \cos\psi_1 \end{bmatrix} \begin{bmatrix} C(t_1) \\ -S(t_1) \end{bmatrix} + \begin{bmatrix} x_1 \\ y_1 \end{bmatrix}.$$

The negative sign on $S(t_1)$ is necessary to reflect the clothoid having its curvature magnitude increasing in the clockwise direction. The second two equations constrain the first and second clothoids to meet at the same point:

$$\pi\beta \begin{bmatrix} \cos\psi_1 & -\sin\psi_1 \\ \sin\psi_1 & \cos\psi_1 \end{bmatrix} \begin{bmatrix} C(u_1) \\ -S(u_1) \end{bmatrix} + \begin{bmatrix} x_1 \\ y_1 \end{bmatrix} =$$
$$\pi\beta \begin{bmatrix} \cos\psi_2 & -\sin\psi_2 \\ \sin\psi_2 & \cos\psi_2 \end{bmatrix} \begin{bmatrix} C(u_2) \\ S(u_2) \end{bmatrix} + \begin{bmatrix} x_2 \\ y_2 \end{bmatrix}.$$

The remaining equations for position are similar. We also need equations to constrain the tangency of the segments. To constrain the first arc to be tangent to the first clothoid we impose:

$$\alpha_1 - \frac{\pi}{2} = \psi_1 - \frac{\pi}{2} t_1^2.$$

To constrain the first and second clothoids to be tangent we use:

$$\psi_1 - \frac{\pi}{2} u_1^2 = \psi_2 + \frac{\pi}{2} u_2^2 - \pi.$$

The other equations that impose the tangency constraint are similar. Finally, to constrain the curvature of the first arc to be the same as the first clothoid we use:

$$\frac{1}{r_1} = \frac{t_1}{B}.$$

To constrain the first and second clothoids to have the same curvatures where they meet we use:

$$\frac{u_1}{B} = \frac{u_2}{B}.$$

The remaining curvature constraints are similar and we can use standard numerical methods to solve these equations with constrained numerical optimization routines that minimize the off-path error with identical results to those found in the previous methods above.

Figure 14:
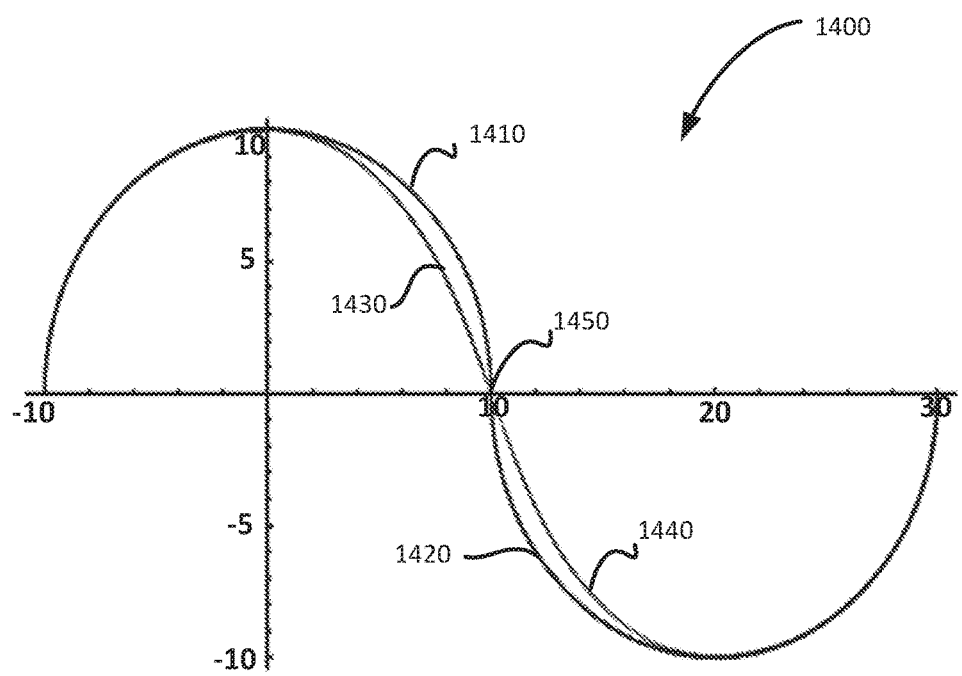
FIG. 14 is a graphical illustration of an optimal transition path plan between first and second arcs.

FIG. 14 illustrates another example of an optimal transition path plan solution 1400 between a tangentially connected first arc 1410 and second arc 1420, where B=5.5, the first arc 1410 is centered at the origin, and the second arc 1420 is centered at (20, 0). FIG. 14 shows the solution generated by the third method with a first portion of a drivable path plan solution 1430 shown diverging away from the first arc 1410 from some initial point and dipping below the first arc 1410. The drivable path plan then passes through the transition connection point where the first and second arcs 1410, 1420 tangentially connect to each other. A second portion of the drivable path plan solution 1440 can then be seen rising above the second arc 1420, and reconnecting with the second arc 1420 at some final point along the second arc 1420.

Although the desired path plan in this example consists of just two circular arc segments of opposite orientation, the extension to more general paths of tangentially-connected arcs and straight lines is straightforward. In general, the third method includes calculating a drivable path plan for an original path plan that includes a first path element tangentially connected to a second path element at some transition connection point. A drivable path plan may be calculated to find an optimal clothoid spline between the first path element and the second path element using the third method described above. The third method identifies an initial connection point, an initial heading, and an initial curvature along the first path element, as well as a final connection point, a final heading, and a final curvature along the second path element. Once the clothoid spline is calculated, it may be inserted between the initial connection point along the first path element and the final connection point along the second path element to create a drivable path plan for an autonomous vehicle to follow.

Figure 15:
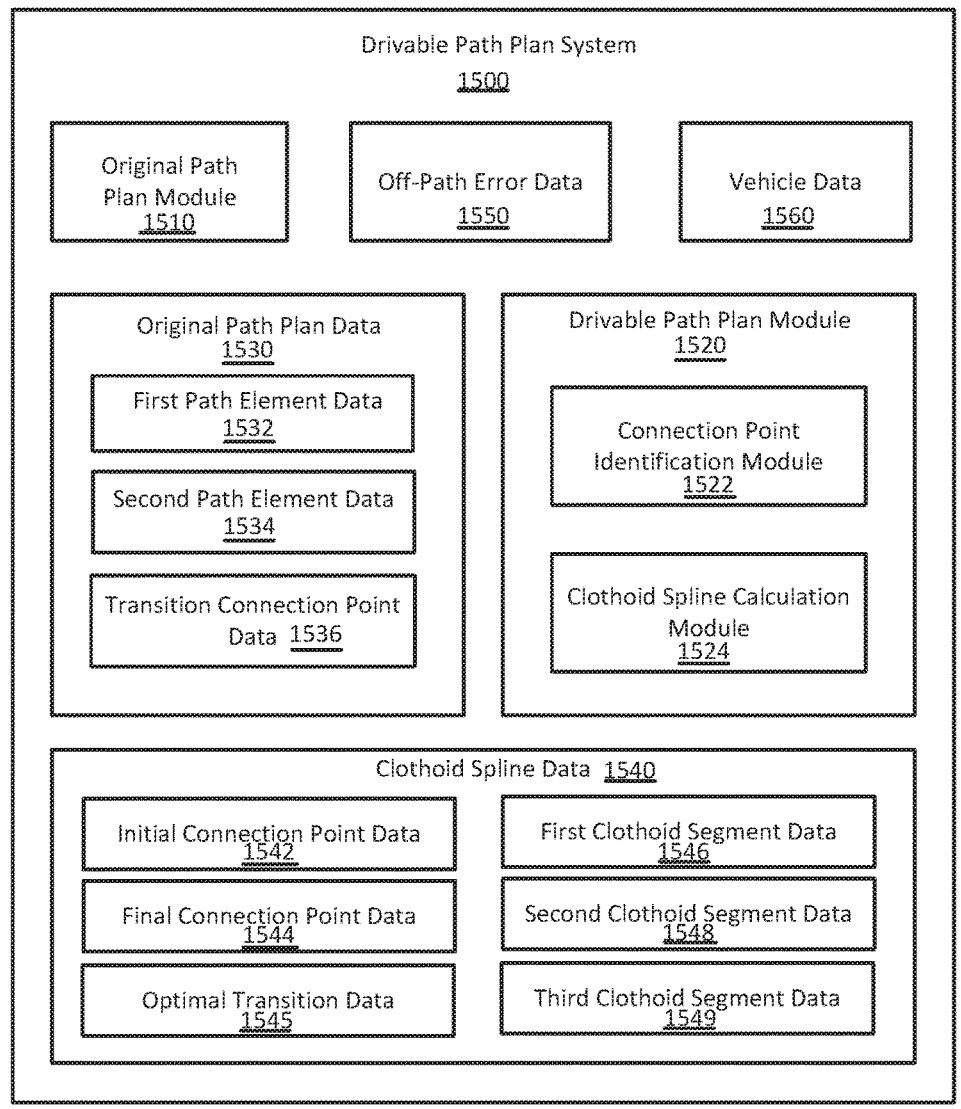
FIG. 15 illustrates a block diagram of a drivable path plan system, according to one embodiment of the present disclosure.

FIG. 15 illustrates a block diagram of a drivable path plan system 1500, according to one embodiment of the present disclosure. The drivable path plan system 1500 may generally include an original path plan module 1510, off-path error data 1550, vehicle data 1560, original path plan data 1530, a drivable path plan module 1520, and clothoid spline data 1540.

The off-path error data 1550 may include data that indicates an off-path deviation of the autonomous vehicle relative to a desired original path plan. The vehicle data 1560 may include data about the autonomous vehicle, including but not limited to: vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like.

The original path plan module 1510 may be configured to receive original path plan data 1530 indicative of an original path plan for an autonomous vehicle. The original path plan may include data relating to a first path element, such as a first circular arc having a first circular arc curvature, as well as a second path element that is tangentially connected to the first path element at a transition connection point. Thus, the original path plan data may include first path element data 1532, second path element data 1534, and transition connection point data 1536.

The drivable path plan module 1520 may be configured to calculate a drivable path plan for the autonomous vehicle between the first path element and the second path element which may include a clothoid spline formed of three clothoid segments, as previously discussed. The drivable path plan module 1520 may also include a connection point identification module 1522 and a clothoid spline calculation module 1524.

The connection point identification module 1522 may be configured to identify a suitable initial connection point, an initial heading, and an initial curvature along the first path element, as well as a suitable final connection point, a final heading, and a final curvature along the second path element. These connection points, headings, and curvatures help define a set of suitable clothoid spline solutions between the selected initial connection point and final connection point, as previously discussed. Accordingly, the clothoid spline data 1540 may include initial connection point data 1542, final connection point data 1544, and optimal transition data 1545, which may comprise other data such as initial heading data, initial curvature data, final heading data, final curvature data, and the like.

The clothoid spline calculation module 1524 may be configured to calculate a suitable clothoid spline between the initial connection point on the first path element and the final connection point on the second path element. The clothoid spline may include a first clothoid segment, a second clothoid segment, and a third clothoid segment connected together to form the clothoid spline. Corresponding first clothoid segment data 1546, second clothoid segment data 1548, and third clothoid segment data 1549 may be stored as clothoid spline data 1540 and may define one or more suitable clothoid spline solutions.

In a particular embodiment, the first clothoid segment may be selected to be tangentially connected to the first path element at the initial connection point. The first clothoid segment may have a first clothoid segment initial curvature and a first clothoid segment final curvature. The first clothoid segment initial curvature may be equal to the first circular arc curvature of the first path element at the initial connection point. The second clothoid segment may be tangentially connected to the first clothoid segment at a second connection point. The second clothoid segment may have a second clothoid segment initial curvature and a second clothoid segment final curvature. The second clothoid segment initial curvature may be equal to the first clothoid segment final curvature at the second connection point. The third clothoid segment may be tangentially connected to the second clothoid segment at a third connection point. The third clothoid segment may have a third clothoid segment initial curvature and a third clothoid segment final curvature. The third clothoid segment initial curvature may be equal to the second clothoid segment final curvature at the third connection point. The third clothoid segment may also be tangentially connected to the second path element at the final connection point and the third clothoid segment final curvature may be equal to a second path element curvature at the final connection point.

In at least one embodiment, the second path element may include a second circular arc having a second circular arc curvature. In other embodiments, the second path element may include a straight line.

In some embodiments, the clothoid spline is selected to minimize a lateral acceleration experienced by the autonomous vehicle as the autonomous vehicle executes a drivable path plan between the first path element and the second path element. In other embodiments, the clothoid spline is selected to minimize an off-path error of the drivable path plan with respect to the original path plan.

Figure 16:
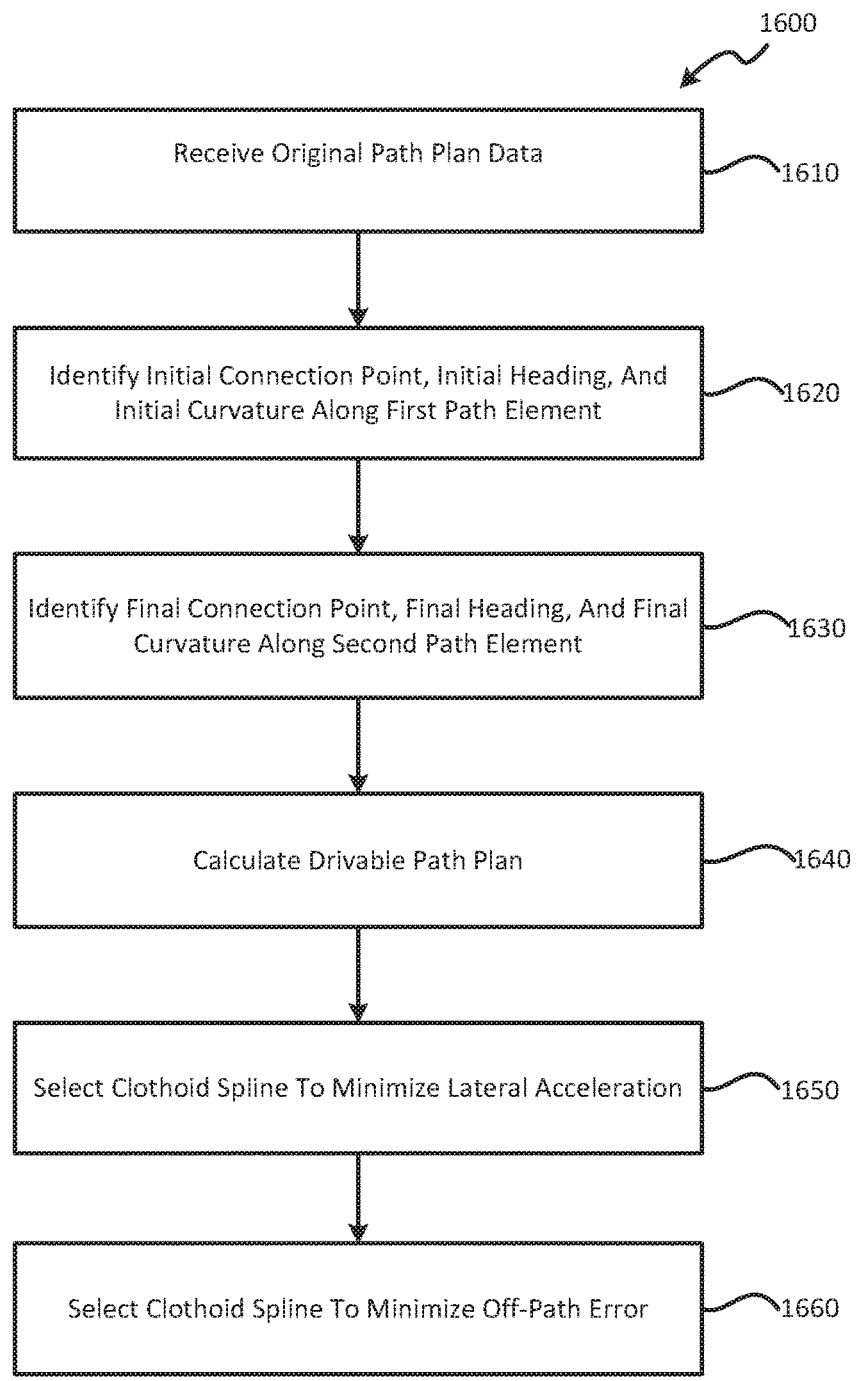
FIG. 16 illustrates a method of calculating a drivable path plan, according to one embodiment of the present disclosure.

FIG. 16 illustrates a method 1600 of calculating a drivable path plan for an autonomous vehicle, according to one embodiment of the present disclosure. The method 1600 may begin with a step 1610 in which original path plan data is received. The original path plan data may indicate an original path plan for an autonomous vehicle including a first path element including a first circular arc having a first circular arc curvature and a second path element tangentially connected to the first path element at a transition connection point.

Once the original path plan data is received, the method 1600 may proceed to a step 1620 in which a suitable initial connection point, initial heading, and initial curvature along the first path element may be identified. A suitable initial connection point may be chosen based on various characteristics of the vehicle including, but not limited to: vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like.

Once a suitable initial connection point, initial heading, and initial curvature along the first path element have been identified, the method 1600 may proceed to a step 1630 in which a suitable final connection point, final heading, and final curvature along the second path element may be identified. Similarly, a suitable final connection point may be chosen based on various characteristics of the vehicle including, but not limited to: vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like.

Once a suitable final connection point, final heading, and final curvature along the second path element have been identified, the method 1600 may proceed to a step 1640 in which one or more drivable path plans may be calculated between the initial connection point along the first path element and the final connection point along the second path element, which may take the form of a clothoid spline made of three clothoid segments, as previously discussed.

Once the one or more drivable path plans have been calculated, the method 1600 may proceed to a step 1650 in which a suitable clothoid spline may be selected to minimize a lateral acceleration experienced by the autonomous vehicle as the autonomous vehicle executes the drivable path plan between the first path element and the second path element. Alternatively, or in addition thereto the method 1600 may proceed to a step 1660 in which in which a suitable clothoid spline may be selected to minimize an off-path error of the drivable path plan with respect to the original path plan. It will be noted that the selection of clothoid splines, as shown in blocks 1650, 1660, may also be accomplished prior to step 1620 in method 1600.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it will be appreciated that in the above description of embodiments, various features are sometimes grouped together in a single embodiment, figure, or description for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Only elements recited in means-plus-function format are intended to be construed in accordance with 35 U.S.C. §112 Para. 6. It will be apparent to those having skill in the art that changes may be made to the details of the above-described embodiments without departing from the underlying principles of the disclosure.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure herein without departing from the spirit and scope of the disclosure.

What is claimed is:

1. A drivable path plan system for an autonomous vehicle, the drivable path plan system comprising:
    an original path plan module configured to receive original path plan data indicative of an original path plan for an autonomous vehicle, the original path plan comprising:
        a first path element comprising a first circular arc having a first circular arc curvature; and
        a second path element tangentially connected to the first path element at a transition connection point;
    a drivable path plan module configured to calculate a drivable path plan for the autonomous vehicle between the first path element and the second path element comprising a clothoid spline, the drivable path plan module comprising:
        a connection point identification module configured to identify an initial connection point, an initial heading, and an initial curvature along the first path element, and a final connection point, a final heading, and a final curvature along the second path element; and
        a clothoid spline calculation module configured to calculate the clothoid spline between the initial connection point on the first path element and the final connection point on the second path element, the clothoid spline comprising:
            a first clothoid segment tangentially connected to the first path element at the initial connection point, the first clothoid segment having a first clothoid segment initial curvature and a first clothoid segment final curvature, wherein the first clothoid segment initial curvature is equal to the first circular arc curvature of the first path element at the initial connection point;
            a second clothoid segment tangentially connected to the first clothoid segment at a second connection point, the second clothoid segment having a second clothoid segment initial curvature and a second clothoid segment final curvature, wherein the second clothoid segment initial curvature is equal to the first clothoid segment final curvature at the second connection point; and
            a third clothoid segment tangentially connected to the second clothoid segment at a third connection point, the third clothoid segment having a third clothoid segment initial curvature and a third clothoid segment final curvature, wherein the third clothoid segment initial curvature is equal to the second clothoid segment final curvature at the third connection point, and wherein the third clothoid segment is tangentially connected to the second path element at the final connection point, wherein the third clothoid segment final curvature is equal to a second path element curvature at the final connection point.

2. The drivable path plan system of claim 1, wherein the second path element comprises a second circular arc having a second circular arc curvature.

3. The drivable path plan system of claim 1, wherein the second path element comprises a straight line.

4. The drivable path plan system of claim 1, wherein the clothoid spline is selected to minimize a lateral acceleration experienced by the autonomous vehicle as the autonomous vehicle executes the drivable path plan between the first path element and the second path element.

5. The drivable path plan system of claim 1, wherein the clothoid spline is selected to minimize an off-path error of the drivable path plan with respect to the original path plan.

6. The drivable path plan system of claim 5, wherein a magnitude of the clothoid spline corresponds to a speed and a constant maximum curvature rate of the autonomous vehicle.

7. The drivable path plan system of claim 6, wherein the autonomous vehicle comprises a rate-limited servo steering system having a maximum turning rate.

8. A method of calculating a drivable path plan for an autonomous vehicle, the method comprising:
　at a processor configured to calculate a drivable path plan for an autonomous vehicle:
　　receiving original path plan data indicative of an original path plan for an autonomous vehicle, the original path plan comprising:
　　　a first path element comprising a first circular arc having a first circular arc curvature; and
　　　a second path element tangentially connected to the first path element at a transition connection point;
　　identifying an initial connection point, an initial heading, and an initial curvature along the first path element, and a final connection point, a final heading, and a final curvature along the second path element; and
　　calculating a drivable path plan for the autonomous vehicle between the first path element and the second path element, the drivable path plan comprising a clothoid spline, wherein the clothoid spline comprises:
　　　a first clothoid segment tangentially connected to the first path element at the initial connection point, the first clothoid segment having a first clothoid segment initial curvature and a first clothoid segment final curvature, wherein the first clothoid segment initial curvature is equal to the first circular arc curvature of the first path element at the initial connection point;
　　　a second clothoid segment tangentially connected to the first clothoid segment at a second connection point, the second clothoid segment having a second clothoid segment initial curvature and a second clothoid segment final curvature, wherein the second clothoid segment initial curvature is equal to the first clothoid segment final curvature at the second connection point; and
　　　a third clothoid segment tangentially connected to the second clothoid segment at a third connection point, the third clothoid segment having a third clothoid segment initial curvature and a third clothoid segment final curvature, wherein the third clothoid segment initial curvature is equal to the second clothoid segment final curvature at the third connection point, and wherein the third clothoid segment is tangentially connected to the second path element at the final connection point, wherein the third clothoid segment final curvature is equal to a second path element curvature at the final connection point.

9. The method of claim 8, wherein the second path element comprises a second circular arc having a second circular arc curvature.

10. The method of claim 8, wherein the second path element comprises a straight line.

11. The method of claim 8, wherein the clothoid spline is selected to minimize a lateral acceleration experienced by the autonomous vehicle as the autonomous vehicle executes the drivable path plan between the first path element and the second path element.

12. The method of claim 8, wherein the clothoid spline is selected to minimize an off-path error of the drivable path plan with respect to the original path plan.

13. The method of claim 12, wherein a magnitude of the clothoid spline corresponds to a speed and a constant maximum curvature rate of the autonomous vehicle.

14. The method of claim 13, wherein the autonomous vehicle comprises a rate-limited servo steering system having a maximum turning rate.

15. A computer program product for calculating a drivable path plan for an autonomous vehicle, the computer program product comprising:
　a nontransitory computer readable medium; and
　computer program code, encoded on the nontransitory computer readable medium, configured to cause at least one processor to perform the steps of:
　　receiving original path plan data indicative of an original path plan for an autonomous vehicle, the original path plan comprising:
　　　a first path element comprising a first circular arc having a first circular arc curvature; and
　　　a second path element tangentially connected to the first path element at a transition connection point;
　　identifying an initial connection point, an initial heading, and an initial curvature along the first path element, and a final connection point, a final heading, and a final curvature along the second path element; and
　　calculating a drivable path plan for the autonomous vehicle between the first path element and the second path element, the drivable path plan comprising a clothoid spline, wherein the clothoid spline comprises:
　　　a first clothoid segment tangentially connected to the first path element at the initial connection point, the first clothoid segment having a first clothoid segment initial curvature and a first clothoid segment final curvature, wherein the first clothoid segment initial curvature is equal to the first circular arc curvature of the first path element at the initial connection point;
　　　a second clothoid segment tangentially connected to the first clothoid segment at a second connection point, the second clothoid segment having a second clothoid segment initial curvature and a second clothoid segment final curvature, wherein the second clothoid segment initial curvature is equal to the first clothoid segment final curvature at the second connection point; and
　　　a third clothoid segment tangentially connected to the second clothoid segment at a third connection point, the third clothoid segment having a third clothoid segment initial curvature and a third clothoid segment final curvature, wherein the third clothoid segment initial curvature is equal to the second clothoid segment final curvature at the third connection point, and wherein the third clothoid segment is tangentially connected to the second path element at the final connection point, wherein the third clothoid segment final curvature is equal to a second path element curvature at the final connection point.

16. The computer program product of claim 15, wherein the second path element comprises a second circular arc having a second circular arc curvature.

17. The computer program product of claim 15, wherein the second path element comprises a straight line.

18. The computer program product of claim 15, wherein the clothoid spline is selected to minimize a lateral acceleration experienced by the autonomous vehicle as the autonomous vehicle executes the drivable path plan between the first path element and the second path element.

19. The computer program product of claim 15, wherein the clothoid spline is selected to minimize an off-path error of the drivable path plan with respect to the original path plan.

20. The computer program product of claim 19, wherein a magnitude of the clothoid spline corresponds to a speed and a constant maximum curvature rate of the autonomous vehicle.

\* \* \* \* \*